United States Patent [19]

Miller

[11] Patent Number: 5,603,833

[45] Date of Patent: Feb. 18, 1997

[54] BIOLOGICAL REMOVAL OF PHOSPHORUS AND NITROGEN FROM WASTEWATER USING A STRESSED CONTACT ZONE AND A LUXURY CONTACT ZONE

[76] Inventor: Stanley D. Miller, Rte. 4, Box 127, Joplin, Mo. 64804

[21] Appl. No.: 372,562

[22] Filed: Jan. 13, 1995

[51] Int. Cl.⁶ ................... C02F 3/02; C02F 3/12
[52] U.S. Cl. .......... 210/624; 210/626; 210/903; 210/906
[58] Field of Search ................ 210/605, 620, 210/623, 624, 626, 630, 903, 906

[56] References Cited

U.S. PATENT DOCUMENTS

| | | | |
|---|---|---|---|
| Re. 32,429 | 6/1987 | Spector | 210/906 |
| 3,953,327 | 4/1976 | Parker | 210/903 |
| 3,964,998 | 6/1976 | Barnard | 210/906 |
| 4,056,465 | 11/1977 | Spector | 210/906 |
| 4,160,724 | 7/1979 | Laughton | 210/906 |
| 4,488,967 | 12/1984 | Block et al. | 210/906 |
| 4,650,585 | 3/1987 | Hong et al. | 210/906 |
| 5,022,993 | 6/1991 | Williamson | 210/906 |
| 5,160,043 | 11/1992 | Kos | 210/903 |
| 5,182,021 | 1/1993 | Spector . | |
| 5,234,595 | 8/1993 | DiGregorio et al. | 210/903 |
| 5,266,200 | 11/1993 | Reid | 210/906 |

FOREIGN PATENT DOCUMENTS 5392551  8/1978  Japan .

OTHER PUBLICATIONS

"A/O Process™ Concepts; A/O Reactor Description", *Air Products and Chemicals, Inc.*, pp. B-1-B-4.
"Newly Patented Process Reduces Phosphorus Levels", *Water/Engineering & Management*, p. 15, Aug., 1994.

Primary Examiner—Peter A. Hruskoci
Assistant Examiner—Theodore M. Green
Attorney, Agent, or Firm—Wood, Herron & Evans, P.L.L.

[57] ABSTRACT

This invention is directed to an activated sludge treatment process for removing phosphorus and nitrogen from wastewater. The process includes providing wastewater influent and activated sludge in a stressed contact zone to form a mixed liquor. In a luxury contact zone, the mixed liquor is mixed and aerated and the organisms in the activated sludge take up at least portion of the phosphorus. The method further includes separating the activated sludge from the mixed liquor, and returning at least a portion of the activated sludge to the stressed contact zone. The inventive process accomplishes wastewater treatment without having to pass the wastewater through an anaerobic zone.

16 Claims, 1 Drawing Sheet

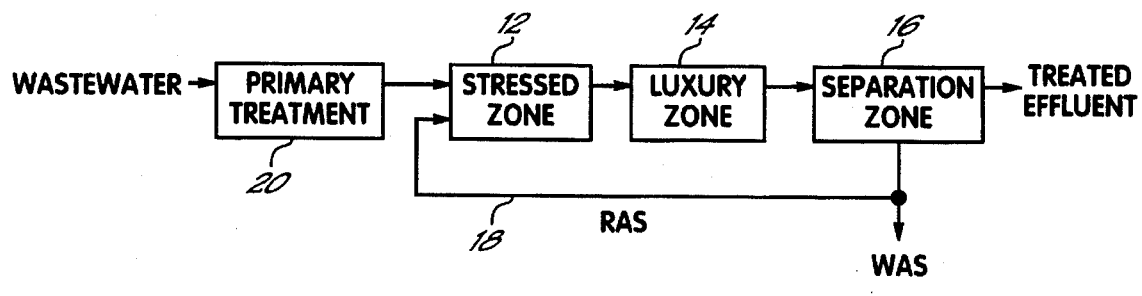

BIOLOGICAL REMOVAL OF PHOSPHORUS AND NITROGEN FROM WASTEWATER USING A STRESSED CONTACT ZONE AND A LUXURY CONTACT ZONE

BACKGROUND OF THE INVENTION

1. Field of the Invention

This invention relates to activated sludge systems and methods for the treatment of wastewater, and more particularly, to activated sludge systems and methods for the biological nutrient removal of phosphorus and nitrogen from wastewater using a stressed contact zone and a luxury contact zone.

2. Description of the Related Art

Wastewater treatment plants have long been subject to governmental regulation controlling levels of biochemical oxygen demand (BOD), total suspended solids (TSS), ammonia nitrogen ($NH_3$) and dissolved oxygen (DO) in treated effluent. More recently, however, several of these plants have been faced with effluent permit limitations on nitrate nitrogen ($NO_3$) and phosphorus (P). The primary reason for regulating nitrates and phosphorus is that these nutrients promote unwanted growth of algae and other aquatic plants. In order to control this eutrophication problem, governmental agencies will continue to enact increasingly stringent regulations further limiting the amount of such nutrients which can be discharged into receiving waters. Therefore, it is important to have a cost effective method for removing biological nutrients, such as nitrogen and phosphorus from wastewater.

One general method for removing nutrients from wastewater is biological treatment in an activated sludge system. One such method is the Bardenpho Activated Sludge Process. The Bardenpho Process requires five (5) different treatment zones: an anaerobic zone, a first anoxic zone, a first aerobic zone, a second anoxic zone, and a final aerobic zone. In the anaerobic zone, wastewater influent is combined with return activated sludge (RAS) to form a mixed liquor. The organisms in this mixed liquor consume BOD and release phosphorus into solution in the form of soluble inorganic phosphorus. When the mixed liquor moves into the first anoxic zone, where biological denitrification occurs, a mixed liquor recycle from the first aerobic zone brings nitrites and nitrates back into the first anoxic zone, where organisms consume the nitrate oxygen, producing nitrogen gas ($N_2$) and nitrous oxide ($N_2O$). In the first aerobic zone, nitrifying organisms oxidize the ammonia to nitrite and nitrate, while the phosphorus-removing organisms take up phosphorus. The nitrogen and phosphorus removal process is continued further in the second anoxic and second aerobic treatment zones.

Another method for biological removal of phosphorus and nitrogen in an activated sludge system is the A/O process. The A/O process is essentially a simplified version of the Bardenpho Process, eliminating the second anoxic zone and second aerobic zone.

Concurrent biological nitrification and denitrification (CBND) provides yet another modified activated sludge method for biological nutrient removal. The CBND process calls for an anaerobic zone, an aerobic zone, an optional anoxic zone, and an anaerobic RAS holding tank. With the CBND system, RAS is held in the anaerobic holding tank until complete denitrification of the RAS has occurred. RAS is then combined with wastewater influent in the anaerobic contact zone to create a mixed liquor. Organisms release soluble inorganic phosphorus in this zone. The mixed liquor then moves into the aerobic zone, where various organisms achieve concurrent biological nitrification and denitrification, as well as phosphorus uptake. The optional anoxic zone allows for continued denitrification and phosphorus uptake. See Spector, U.S. Pat. No. 5,182,021.

More recently, a system called the POH Process has been developed for biological phosphorus removal. The POH Process achieves low effluent phosphorus levels through the use of three independently controlled processes. The first process is a mainstream activated sludge process that uses aeration and solids separation zones and return activated sludge to remove phosphorus. The second process is a side stream process for exposure of a portion of the RAS under anoxic conditions to remove nitrates followed by anaerobic conditions to allow organism selection and soluble phosphorus release. The third process involves a second side stream process having an anaerobic zone to satisfy the metabolic needs of the desired phosphorus removing organisms during the organism selection process. See *WATER/Engineering & Management*, August, 1994, page 15.

Although these various methods provide for the removal of phosphorus and nitrogen, they present practical limitations for many of the wastewater treatment plants across the country. These plants are not designed to provide the required elements, such as the number of treatment zones, sludge holding tanks, or mainstream and multiple side stream flows. Therefore, in order for these plants to meet nitrogen and phosphorus effluent limits using these processes, the respective municipalities would have to spend a great deal of money to modify the plants. In addition, all of the methods mentioned above are likely to have odor problems because of the use of anaerobic treatment zones. Because of the lack of DO in these anaerobic zones, many of the organisms decay, producing undesirable odors.

Therefore, it is desirable to have a biological nitrogen and phosphorus removal process which may be used in many existing activated sludge treatment facilities without significant expenditure to reconfigure the various plants. It would also be desirable to have a process which avoids potential odor problems due to anaerobic treatment zones.

SUMMARY OF THE INVENTION

This invention involves an activated sludge treatment process for removing phosphorus from wastewater. The process includes providing wastewater influent and activated sludge in a stressed contact zone to form a mixed liquor. In a luxury contact zone, the mixed liquor is mixed and aerated and the organisms in the activated sludge take up at least portion of the phosphorus. The method further includes separating the activated sludge from the mixed liquor, and returning at least a portion of the activated sludge to the stressed contact zone. The inventive process accomplishes wastewater treatment without having to pass the wastewater through an anaerobic zone.

The DO concentration in the stressed zone preferably is about 0.5 ppm or less, more preferably from about 0.1 to about 0.4 ppm, most preferably from about 0.15 to about 0.2 ppm. The DO concentration in the luxury contact zone preferably is from about 0.8 to about 4 ppm, more preferably from about 1.5 to about 2 ppm. In another preferred form of the invention, the luxury contact zone includes a mixed liquor entry region having a DO concentration of from about 2.5 to about 3 ppm.

With respect to alkalinity, the stressed contact zone preferably has an alkalinity of about 170 to 450 ppm, more preferably about 300 ppm. The luxury contact zone preferably has an alkalinity of from about 125 to about 220 ppm, more preferably about 180 ppm. In addition, the activated sludge being returned from the separation zone to the stressed contact zone preferably has an alkalinity below about 800 ppm, more preferably from about 300 to about 500 ppm.

With respect to detention times, the mixed liquor preferably is detained for a period of from about 12 hours to about 72 hours in each of the stressed contact zone and luxury contact zone, more preferably from about 24 hours to about 30 hours.

If desired, the invention also may include passing the wastewater through a primary treatment zone, such as a Parshall flume, bar screen, grit chamber, primary clarifier, and the like or combination thereof.

In another aspect of the invention, the process includes the step of removing nitrate nitrogen by providing the wastewater influent with the activated sludge in the stressed zone, and removing ammonia nitrogen by mixing and aerating the mixed liquor in the luxury contact zone.

The process described above provides several benefits and advantages. For example, the method may be practiced by many wastewater treatment plants unable to adopt other biological nutrient removal methods without drastic modifications to the treatment plant facilities. In addition, the inventive process does not require the use of an anaerobic zone, thereby reducing the likelihood of odor problems. Furthermore, this process results in improved sludge settling and a relatively low blanket. Therefore, inadvertent sludge escape into the effluent stream is reduced, and cost savings may be achieved through reduced wasted activated sludge (WAS) processing time.

BRIEF DESCRIPTION OF THE DRAWING

The FIGURE is a schematic flow diagram of an activated sludge system which may be used with the process of the invention.

DETAILED DESCRIPTION OF THE INVENTION

As used herein, the term "anaerobic" refers to the unavailability of free oxygen.

Referring to the Figure, the process for biological nutrient removal includes providing wastewater influent and activated sludge in a stressed contact zone 12 to form a mixed liquor. "Mixed liquor" means a mixture of raw or settled wastewater and activated sludge. The method further includes mixing and aerating the mixed liquor in a luxury contact zone 14, and separating the activated sludge from the mixed liquor in a separation zone 16. The process further includes the step of returning at least a portion of the activated sludge from the separation zone 16 to the stressed contact zone 12, using a return activated sludge (RAS) pipe 18 or other RAS conduit as is known in the art. In addition, if desired, the process also may include the step of passing the wastewater through a primary treatment zone 20 such as a Parshall flume, bar screen, grit chamber, primary clarifier and the like, or combination thereof, or other means of primary treatment as is well known in the art.

Wastewater influent and RAS are provided in the stressed zone to form a mixed liquor. Preferably, the influent and RAS are mixed within this zone to minimize settling, although mixing is not essential. If suspended solids fall out of the mixed liquor, they will migrate toward the bottom of the zone, where they will become highly stressed. At that point, the suspended solids will form gases which will float the solids toward the top of the mixed liquor, thereby creating a natural mixing effect.

The stressed contact zone is characterized by having low levels of dissolved oxygen, and the DO concentration should be maintained at a level of about 0.5 ppm or less. "Stressed contact zone" means a contact zone having a DO concentration of about 0.5 ppm or less, without placing the organisms in an anaerobic state. This relatively low level of DO is needed to stress the organisms and achieve biological denitrification. Preferably, the DO concentration ranges from about 0.1 to about 0.4 ppm, and more preferably from about 0.15 to about 0.2 ppm. These increasingly preferred DO concentrations provide more optimal levels of organism stressing while avoiding a completely anaerobic environment. The DO concentration may be controlled by adjusting the degree of aeration of the mixed liquor as is known in the art. For example, rotors, diffusors, propellers, air conduits and the like may be used.

If desired, alkalinity also may be monitored in order to make a finer measurement of organism stressing and to fine-tune the DO concentration. Below a DO concentration of about 0.1 ppm, DO meters tend to be very inaccurate, making it difficult to monitor and control the environment using DO measurements alone. In addition, alkalinity readings provide another useful measure of organism stressing at any DO concentration. For example, the microorganisms generally function in the biological pH range of about 6 to 8. If pH falls outside this range, the organisms will cease to function.

Preferably, alkalinity should be maintained in a range of from about 170 to about 450 ppm, and optimally at about 300 ppm. Below about 170 ppm, the stressed zone begins to become aerobic and the organisms are not sufficiently stressed, while above about 450 ppm, the zone becomes anaerobic and the organisms are too stressed. Optimal alkalinity of about 300 ppm provides the most desired level of organism stressing, and also provides sufficient alkalinity carry-over into the luxury zone where alkalinity is consumed by biological nitrification. If alkalinity falls outside the desired ranges, it may be adjusted by altering the DO concentration in the zone.

The mixed liquor should remain in the stressed zone for a period of from about 12 to about 72 hours, and more preferably, from about 24 to about 30 hours. Although detention times of less than 12 hours may be used, these preferred ranges provide increasingly optimal levels or organism stressing, leading to enhanced levels of phosphorus and nitrogen removal. Detention times greater than about 72 hours may result in ashing, whereby there is complete consumption of the BOD and the organisms begin endogenous respiration.

It is believed that the stressing environment induces both phosphorus release and denitrification in this zone. In order to absorb BOD in the wastewater influent, the phosphorus removing organisms convert previously stored polyphosphates into soluble orthophosphates which migrate into solution in the mixed liquor. Meanwhile, the denitrifying organisms reduce nitrates and nitrites to nitrogen and/or nitrous oxide which leave the system in gaseous form.

From the stressed zone, the mixed liquor enters into the luxury zone. The mixed liquor should be completely mixed while being maintained in the luxury zone. If the mixed liquor is not thoroughly mixed, suspended solids may fall out, causing the organisms to become stressed. If this stressing occurs, the organisms may produce ammonia and release soluble phosphorus into solution in the luxury zone, which is undesirable.

The luxury zone is characterized by plentiful dissolved oxygen, and "luxury contact zone" means a contact zone having a DO concentration sufficient to avoid organism stressing. Preferably, the DO concentration is maintained in a range of from about 0.8 to about 4 ppm, and optimally in a range from about 1.5 to about 2 ppm. DO concentrations below about 0.8 ppm continue to stress the organisms, while DO values above about 4 ppm are unnecessary and therefore energy used to achieve such DO values is essentially wasted. Furthermore, such high DO concentrations may result in floc shear. The optimal range provides the best balance of low stress, optimal energy consumption and avoidance of floc shear.

Preferably, the first part of the luxury zone is maintained at a slightly elevated DO concentration relative to the remainder of the zone. Most preferably, this mixed liquor entry region is maintained at a DO from about 2.5 to about 3 ppm. The elevated DO concentration causes the organisms to adapt more quickly to the luxury environment thereby resulting in greater rates of phosphorus removal and biological nitrification in the luxury zone.

As was done in the stressed zone, alkalinity may be monitored as a means of further regulating the luxury environment, Preferably, alkalinity in the luxury zone is maintained in a range of from about 125 to about 220 ppm. If alkalinity falls below about 125 ppm, the mixed liquor in this zone will lose some of its buffering capacity, and it may acidify or sour, killing off the organisms. Alternatively, if the alkalinity rises above about 220 ppm, this is an indication that the organisms may still be in a stressed environment. Appropriate adjustments to alkalinity may be made by altering the DO concentration in the zone.

Preferably, the mixed liquor is detained in the luxury zone for a period of from about 12 to about 72 hours, more preferably, from about 24 to about 30 hours, similar to the desired detention times in the stressed zone, to provide more optimal levels of phosphorus and nitrogen removal.

It is believed that the luxury environment induces both phosphorus uptake and nitrification in this zone. The phosphorus removing organisms oxidize absorbed BOD and use the resulting energy to resynthesize and store polyphosphates from soluble orthophosphates in the mixed liquor and to synthesize new cells. Net phosphorus removal is achieved because these organisms take up more phosphorus than was released in the stressed zone. In addition, nitrifying organisms oxidize ammonia to nitrite and nitrate.

From the luxury zone, the mixed liquor is transferred to a separation zone such as a clarifier where the activated sludge is separated from the mixed liquor. Several of the advantages of the inventive process are seen in this separation phase. For example, because filamentous bacteria and fungi do not grow well in changing environments, sludge bulking is reduced. In addition, the inventive process results in a relatively low blanket. This low blanket reduces the risk of blow-out from the separation zone or clarifier, and allows a plant to go beyond its actual hydraulic capacity.

While not fully understood, it is believed that the present invention's ability to remove phosphorus without an anaerobic zone may be due to organism stressing during the step of separating the activated sludge from the mixed liquor. The conventional wisdom has been that an anaerobic contact zone is needed in an activated sludge system in order to induce the microorganisms to produce short-chain fatty acids, which subsequently serve as a catalyst for phosphorus uptake in the aerobic zone. However, as discussed above, the inventive process successfully removes phosphorus without an anaerobic contact zone. It is believed that the microorganisms are producing short-chain fatty acids in the clarifier or separation zone during the separation step, despite the availability of some free oxygen (i.e., the lack of an anaerobic environment). Apparently, the conditions in the clarifier are stressful enough to achieve production of these acids, while avoiding an undesirable anaerobic state which would cause the organisms to release phosphorus in the clarifier.

At least a portion of the activated sludge is returned from the separation zone to the stressed contact zone via an RAS pipe or other conduit as is known in the art. RAS is returned to the stressed zone at a rate appropriate for the particular treatment facility being used as is well known in the art. However, it has been found that an RAS-to-influent ratio [(gal./min. RAS)/(gal./min. influent)] of about 1.5 or less is preferred, as higher rates may overload the clarifier. A more preferred ratio is from about 0.5 to about 0.75. If the ratio falls below about 0.5, the organisms that are returned may become too stressed and there may be insufficient BOD and nutrient removal.

If desired, the RAS may be monitored for alkalinity, to further regulate the level of organism stressing. If monitored, RAS alkalinity preferably is about 800 ppm or less. If RAS alkalinity rises above about 800 ppm, denitrification may occur in the clarifier thereby preventing solids from properly settling. An ideal point for monitoring RAS alkalinity is just before the RAS enters the stressed zone.

A portion of the solids may be removed from the separation zone as wasted activated sludge (WAS). Traditional activated sludge methods typically require significant solids processing time and expense once the sludge is wasted from the clarifier. However, because the inventive method results in a relatively low blanket, solids processing steps and expenses may be reduced, even if the method produces more solids than a municipality's current system. Cost savings may come from reduced use of the WAS pump and belt filter press, for example.

One of the primary advantages of the nutrient removal process described above is that it may readily be used in a vast number of existing wastewater treatment plants. Essentially, any plant capable of providing stressed and luxury contact zones as discussed above is able to carry out this process for biological phosphorus and nitrogen removal. The inventive wastewater treatment method will find particular utility in the many treatment plants capable of providing detention times of as great as 12 hours or more. Examples of such highly suited plants include, for example, extended aeration and oxidation ditch activated sludge systems.

The following example is provided by way of illustration only and is not intended to limit the scope of this invention.

EXAMPLE

The biological nutrient removal process discussed above was conducted in an extended aeration activated sludge treatment facility. This wastewater treatment plant had a design capacity of four million gallons per day (MGD) and an average flow of 2.6 MGD. The plant's BOD loading capacity was 300 mg/L at 4 MGD while the maximum loading for suspended solids (SS) was 350 mg/L at 4 MGD.

In addition, the plant's average influent BOD was about 300 mg/L at 2.6 MGD, with an average SS of about 325 mg/L at 2.6 MGD. Using the process of this invention, wastewater entered the treatment facility and was passed through a primary treatment zone. This treatment zone included a Parshall flume, a bar screen where larger items such as rags, sticks, rocks and the like were removed, and a grit chamber where sand and other small inorganic matter was removed from the waste stream. The resulting wastewater then passed into a mixing box where the wastewater influent was mixed with RAS to form a mixed liquor. This mixed liquor then flowed over an adjustable weir and into a first oxidation ditch which served as the stressed zone. This first ditch included four rotors which were used for mixing the mixed liquor and controlling the DO concentration.

After the mixed liquor was detained in the stressed zone for the desired period of time, the mixed liquor was passed through a crossover pipe into a second oxidation ditch which served as the luxury contact zone. The portion of the second oxidation ditch which received mixed liquor from the stressed zone was maintained at a slightly higher DO concentration relative to the remainder of the luxury zone in order to speed the adjustment of the organisms in the mixed liquor. This was accomplished by increasing the rotor speed of the rotor at the mixed liquor entry region of the second oxidation ditch (the luxury zone). This second ditch further included three additional rotors for mixing the mixed liquor and controlling the DO concentration.

The mixed liquor then flowed from the luxury zone over an adjustable weir and into a clarifier for the separation of sludge from the mixed liquor. The clarified water was discharged to a chlorine contact chamber for disinfection and then released to a receiving stream. The solids were either removed from the system as wasted activated sludge (WAS) or used for RAS. The WAS was sent to thickeners for further concentration, and the supernatant from this thickening step was returned to the influent flow for additional processing. Furthermore, in the thickening process, the stress level of the organisms was kept to a minimum to prevent release of phosphorus back into the system.

Wastewater treatment results are presented in Tables 1–4. In the four tables, the values are daily averages, except for detention time in Table 3 which is shown in average number of days detained. Daily averages are shown month by month for a six month period, with a final average of all the daily values over the same six month period. Table 1 shows daily influent and effluent values for BOD, phosphorus and ammonia expressed in milligrams per liter (mg/L). Referring to Table 2, percent removal values are shown daily for days 2–5 after a given influent reading to account for the fact that wastewater entering the plant on day 1 typically does not leave the plant as treated effluent on the same day but rather leaves over a succession of several days. $Day_x$ percent removal values are calculated according to the following formula: (Day 1 reading—$Day_x$ reading)/Day 1 reading, where x=2, 3, 4 or 5.

Referring to Table 1, when treated effluent values are compared to wastewater influent values, one can see that the process successfully removed BOD, phosphorus and ammonia nitrogen. Nitrate nitrogen values are not shown, although the nitrate is removed as nitrogen or nitrous oxide gas. Referring to Table 2, the percent removal values also show successful BOD, phosphorus and ammonia removal when tracking the wastewater influent entering on a particular day.

Table 3 includes average daily DO concentrations for the stressed zone, luxury zone and mixed liquor entry region within the luxury zone. The table further includes average daily alkalinity concentrations for the stressed zone, luxury zone and RAS. Average daily wastewater influent values and detention times are included as well. The detention times shown represent the average number of days that a given quantity of wastewater remains within the activated sludge system for processing prior to being released into a receiving water as treated effluent.

Table 4 shows the average daily amount of BOD needed to remove all of the ammonia entering the treatment process in the wastewater influent. This value is then compared with the actual amount of BOD entering the treatment process in the wastewater influent (taken from Table 1) to calculate the theoretical BOD remaining after complete ammonia removal. As seen in the table, all the values for BOD after complete ammonia removal are negative. This indicates that actual ammonia removal was somewhat limited by the level of BOD present in the wastewater influent and, had more BOD been present in the influent, even higher levels of ammonia removal would have been achieved.

Table 4 further includes values for the average daily amount of BOD needed to remove all of the phosphorus entering the treatment process in the wastewater influent. This value is then compared with the actual amount of BOD entering the treatment process in the influent (taken from Table 1) to calculate the theoretical BOD remaining after complete phosphorus removal. As was the case for BOD values related to ammonia, all the values for BOD after complete phosphorus removal are negative. The negative numbers indicate that phosphorus removal was limited by the actual amount of BOD present in the influent. Had more BOD been available for the organisms, significantly higher levels of phosphorus removal could have been achieved.

Other modifications of the invention will be apparent to one of ordinary skill in the art, and the scope of this invention is to be determined by the following claims and their equivalents.

TABLE 1

| | Average Daily BOD and Nutrient Values (mg/L) | | | | | |
| --- | --- | --- | --- | --- | --- | --- |
| | In Wastewater Influent | | | In Treated Effluent | | |
| Month | BOD | PHOS | $NH_3$ | BOD | PHOS | $NH_3$ |
| 1 | 162 | 13 | 14 | 3.9 | 7.6 | 0.22 |
| 2 | 285 | 21 | 21 | 5.3 | 13.4 | 0.21 |
| 3 | 281 | 27 | 26 | 5.1 | 21 | 0.23 |
| 4 | 262 | 21 | 24 | 3.5 | 16.9 | 0.35 |
| 5 | 255 | 25 | 27 | 5 | 20.7 | 1.3 |
| 6 | 359 | 23 | 27 | 7.3 | 17.4 | 1.08 |
| DAILY AVG. FOR 6 MONTH PERIOD | 267.33 | 21.67 | 23.17 | 5.02 | 16.17 | 0.57 |

TABLE 2

| | % BOD and Nutrient Removal (values are percentages for days 2–5 after influent measurements) | | | | | | | | | | | |
|---|---|---|---|---|---|---|---|---|---|---|---|---|
| | BOD % REMOVAL | | | | PHOS. % REMOVAL | | | | NH$_3$ % REMOVAL | | | |
| MONTH | 2 DAY | 3 DAY | 4 DAY | 5 DAY | 2 DAY | 3 DAY | 4 DAY | 5 DAY | 2 DAY | 3 DAY | 4 DAY | 5 DAY |
| 1 | 95 | 97 | 96 | 96 | 32 | 30 | 27 | 29 | 98 | 98 | 98 | 98 |
| 2 | 98 | 98 | 98 | 98 | 33 | 35 | 29 | 22 | 99 | 99 | 99 | 99 |
| 3 | 98 | 98 | 98 | 98 | 22 | 22 | 26 | 27 | 99 | 99 | 99 | 99 |
| 4 | 99 | 99 | 99 | 99 | 15 | 22 | 12 | 15 | 98 | 98 | 98 | 98 |
| 5 | 98 | 98 | 98 | 98 | 8 | 13 | 7 | 6 | 95 | 94 | 94 | 94 |
| 6 | 98 | 98 | 98 | 98 | 26 | 32 | 28 | 34 | 97 | 97 | 97 | 97 |
| DAILY AVG. FOR 6 MONTH PERIOD | 97.67 | 98.00 | 97.83 | 97.83 | 22.67 | 25.67 | 21.50 | 22.17 | 97.67 | 97.50 | 97.50 | 97.50 |

TABLE 3

| | D.O. CONCENTRATIONS (mg/L) | | | ALKALINITY CONCENTRATIONS (mg/L) | | | WASTEWATER INFLUENT (MGD) | DETENTION TIME (DAYS) |
|---|---|---|---|---|---|---|---|---|
| MONTH | STRESSED ZONE | LUXURY ZONE | MIXED LIQUOR ENTRY REGION | STRESSED ZONE | LUXURY ZONE | RAS | | |
| 1 | 0.078 | 1.87 | 1.77 | 214 | 153 | 379 | 3.038 | 2.2 |
| 2 | 0.075 | 1.45 | 1.31 | 235 | 131 | 305 | 1.906 | 3.2 |
| 3 | 0.045 | 2.55 | 2.47 | 212 | 125 | 201 | 1.905 | 3.2 |
| 4 | 0.079 | 2.27 | 2.23 | 176 | 95 | 146 | 2.028 | 3 |
| 5 | 0.083 | 2.35 | 2.33 | 213 | 95 | 148 | 1.847 | 3.3 |
| 6 | 0.11 | 2.45 | 2.24 | 238 | 143 | 141 | 1.822 | 3.3 |
| DAILY AVG. FOR 6 MONTH PERIOD | 0.078 | 2.157 | 2.058 | 215 | 124 | 220 | 2.09 | 3.03 |

TABLE 4

| | Average Daily B.O.D. (pounds) | | | |
|---|---|---|---|---|
| MONTH | BOD NEEDED TO REMOVE NH$_3$ | BOD AFTER COMPLETE NH$_3$ REMOVAL | BOD NEEDED TO REMOVE PHOS. | BOD AFTER COMPLETE PHOS. REMOVAL |
| 1 | 7197 | −3500 | 6650 | −2981 |
| 2 | 8288 | −3823 | 7244 | −2805 |
| 3 | 10350 | −5924 | 8746 | −4325 |
| 4 | 9655 | −5341 | 7011 | −2868 |
| 5 | 10298 | −6419 | 7472 | −3470 |
| 6 | 10480 | −5049 | 7121.4 | −1384 |
| DAILY AVG. FOR 6 MONTH PERIOD | 9377.67 | −5009.33 | 7374.07 | −2972.17 |

What is claimed is:

1. An activated sludge treatment process for removing phosphorus from wastewater, comprising the steps of:

providing wastewater influent and activated sludge in a stressed contact zone to form a mixed liquor and detaining said mixed liquor in said stressed zone for a period of from about 12 to about 72 hours, said stressed zone having a dissolved oxygen concentration of from about 0.1 to about 0.4 ppm and an alkalinity of from about 170 to about 450 ppm, said activated sludge including microorganisms;

mixing and aerating said mixed liquor in a luxury contact zone and detaining said mixed liquor in said luxury zone for a period of from about 12 to about 72 hours during mixing and aerating, said luxury zone having a dissolved oxygen concentration of from about 0.8 to about 4 ppm and an alkalinity of from about 125 to about 220 ppm, said luxury contact zone further having a mixed liquor entry region, said entry region having a dissolved oxygen concentration of from about 2.5 ppm to about 3 ppm, at least a portion of said microorganisms in said activated sludge taking up at least a portion of said phosphorus;

separating said activated sludge from said mixed liquor in a separation zone; and returning at least a portion of said activated sludge directly from said separation zone to said stressed contact zone.

2. The process of claim 1 wherein said mixed liquor is detained for a period of from about 24 to about 30 hours in each of said stressed contact zone and said luxury contact zone.

3. The process of claim 2 wherein said stressed zone has a dissolved oxygen concentration of from about 0.15 to about 0.2 ppm and said luxury zone has a dissolved oxygen concentration of from about 1.5 to about 2 ppm.

4. The process of claim 3 wherein said stressed zone has an alkalinity of about 300 ppm and said luxury zone has an alkalinity of about 180 ppm.

5. The process of claim 1 further comprising the step of passing said wastewater through a primary treatment zone.

6. The process of claim 1 further including the step of removing nitrate from said wastewater by combining said wastewater influent with said activated sludge in said stressed contact zone.

7. The process of claim 6 further comprising the step of removing ammonia from said wastewater by mixing and aerating said mixed liquor in said luxury contact zone.

8. The process of claim 1 wherein said activated sludge being returned from said separation zone to said stressed contact zone has an alkalinity below about 800 ppm.

9. The process of claim 8 wherein said activated sludge being returned from said separation zone to said stressed contact zone has an alkalinity of from about 300 ppm to about 500 ppm.

10. An activated sludge treatment process for removing phosphorus from wastewater, comprising the steps of:

providing wastewater influent and activated sludge in a stressed contact zone to form a mixed liquor and detaining said mixed liquor in said stressed zone for a period of from about 24 to about 30 hours, said stressed zone having a dissolved oxygen concentration of from about 0.15 to about 0.2 ppm and an alkalinity of from about 170 to about 450 ppm, said activated sludge including microorganisms;

mixing and aerating said mixed liquor in a luxury contact zone and detaining said mixed liquor in said luxury zone for a period of from about 24 to about 30 hours during mixing and aerating, said luxury zone having a dissolved oxygen concentration of from about 1.5 to about 2 ppm and an alkalinity of from about 125 to about 220 ppm, said microorganisms in said activated sludge taking up at least a portion of said phosphorus;

separating said activated sludge from said mixed liquor in a separation zone; and returning at least a portion of said activated sludge directly from said separation zone to said stressed contact zone.

11. The process of claim 10 wherein said stressed zone has an alkalinity of about 300 ppm and said luxury zone has an alkalinity of about 180 ppm.

12. The process of claim 10 further comprising the step of passing said wastewater through a primary treatment zone.

13. The process of claim 10 further including the step of removing nitrate from aid wastewater by combining said wastewater influent with said activated sludge in said stressed contact zone.

14. The process of claim 13 further comprising the step of removing ammonia from said wastewater by mixing and aerating said mixed liquor in said luxury contact zone.

15. The process of claim 10 wherein said activated sludge being returned from said separation zone to said stressed contact zone has an alkalinity below about 800 ppm.

16. The process of claim 15 wherein said activated sludge being returned from said separation zone to said stressed contact zone has an alkalinity of from about 300 ppm to about 500 ppm.

* * * * *